Oct. 31, 1933.   K. E. LATIMER   1,933,270
CABLE MANUFACTURE
Filed Oct. 2, 1930
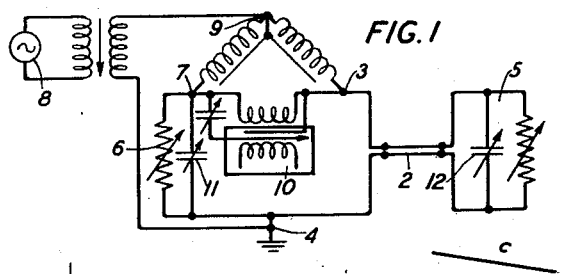
FIG. 1
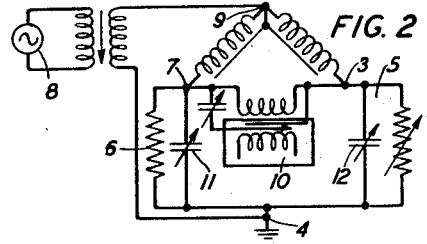
FIG. 2
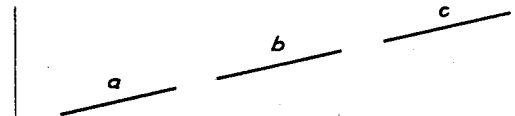
FIG. 3
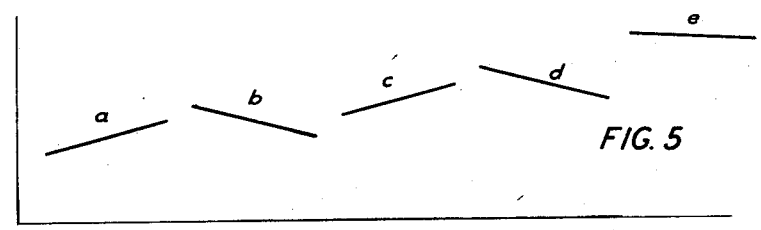
FIG. 4
FIG. 5
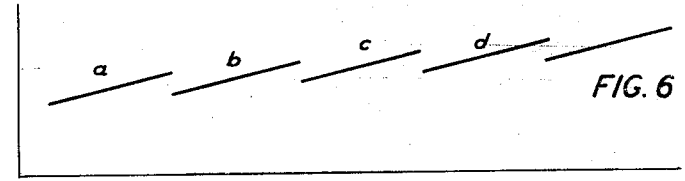
FIG. 6
FIG. 7
INVENTOR
K. E. LATIMER
BY J. W. Schmied
ATTORNEY Patented Oct. 31, 1933

1,933,270

UNITED STATES PATENT OFFICE 1,933,270

CABLE MANUFACTURE

Kenneth Eric Latimer, Aldwych, London, England, assignor to Western Electric Company, Incorporated, New York, N. Y., a corporation of New York Application October 2, 1930, Serial No. 485,948, and in Great Britain January 7, 1930

5 Claims. (Cl. 178—45)

This invention relates to the manufacture of electric communication cables.

It is known that, in order to provide a cable, for example, a repeatered telephone cable free from reflection effects or echo currents, it is necessary that the cable should have great uniformity with respect to impedance. It is usual, therefore, in assembling manufactured lengths of cable to measure separately the various electrical constants of each length such as, for example, the capacity and inductance, and connect the sections together according to an allocation scheme which gives the minimum of difference in the cable constants of the sections connected together.

When a cable is desired to transmit efficiently frequencies of a fairly high order, for example, in the order of 20,000 cycles per second, the above method has the difficulty that at such a wave length the manufactured cable section cannot be considered to be an elemental length because there might be an irregular distribution of constants within each such section.

According to one feature of the present invention a method comprises connecting together the manufacturing lengths of a cable, after choosing the allocation according to the direction of variation of one or more of the cable constants within each manufacturing length. Portions of a manufacturing length, (for example, half lengths or quarter lengths) are considered as elemental portions, instead of whole lengths are hitherto. "Direction of variation" as the term fairly signifies, indicates or refers to the direction in which the constants of the cable conductor vary within a manufacturing length.

According to another feature the invention provides a cable in which each section is connected to other sections having regard to the direction and magnitude of the non-uniformity of its electrical constants within that section, so that when the impedance of each elemental portion of cable is plotted as a function of its position in the completed cable, the resulting curve is smooth, or alternatively has some regular pattern. By "elemental portion" is here understood a portion of a manufacturing length, say a half or a quarter, or at any rate a portion short compared with a wave length.

According to another feature of the invention manufacturing lengths which have impedance characteristics such that if they were placed near the shore ends, the curve of impedances of elemental portions referred to above would be neither smooth nor have a regular pattern, such lengths would be either placed in the middle of the cable or cut into two or more portions, each of which would be allocated separately in accordance with the above principles.

Another feature of the invention is the method of measuring the characteristic of the cable sections, whereby the allocation may be determined, which comprises testing the cable at approximately the highest frequency for which it is to be used, the sections of the cable which are placed under test being of lengths which for manufacturing convenience or mechanical reasons are of the same order as the wave length.

According to another feature of the invention, when the core is of the single conductor type, the concentric return conductor is applied on the individual core lengths and when a twin core is used, the twinning is completed before the tests in each case, in order to be able to obtain the inductance, attenuation, and velocity which will exist in practice. Any or all of the above features may be applied either to the whole cable or only to those portions which are nearest the ends of the cable.

Other features of the invention will be disclosed in the following description having reference to the accompanying drawing in which:

Figs. 1 and 2 illustrate a form of bridge used in making certain measurements necessary for the carrying out of the invention.

Figs. 3, 4, 5 and 6 illustrate various allocation schemes according to the present invention.

Fig. 7 is a diagram illustrating the principle of the invention.

In carrying out the present invention it will be necessary to consider only the inductance and capacity of the sections for determining the final allocation scheme. For measuring the inductance and capacity of a cable section it may be connected to a bridge as shown in Fig. 1 in which the cable section 2 is connected between bridge terminals 3 and 4. At the other end of the cable section a terminating network 5 is connected and a similar network 6 is connected to the bridge at terminals 4 and 7. A source of alternating current 8 is coupled as shown to the bridge points 9 and 4, the bridge point 4 being also connected to earth. The alternating current used for testing is of a frequency approximately corresponding to the highest frequency the cable is to transmit. The detecting instrument 10 is connected as shown between the points 7 and 3 of the bridge. The networks 6 and 5 contain condensers 11 and 12 respectively and these condensers are ganged together so as to be controlled by a common dial, a key (not shown) is provided to enable a check to be made of the equality of the impedance between the terminating network and the bridge arm. The connections of the bridge arm are designed to be rearranged by means of said key so as to give the connections shown in Fig. 2. With the connections as shown in Fig. 1 adjustments are made in the bridge until a balance is obtained, the key is then thrown to give the connections shown in Fig. 2 and adjustments are again made until a balance is reached. By alternately switching backward and forward with adjustments at each reversal a condition of the bridge may be found in which balance is obtained in throwing the key in either direction, i. e. the bridge is balanced for the conditions shown in Fig. 1 and in Fig. 2, this bridge reading is then noted, the two ends of the cable are then reversed and a fresh reading obtained.

It will be observed that the only reading giving bridge balance for both the circuit connections of Fig. 1 and Fig. 2 must be that corresponding to the iterative impedance of the cable section. On a uniform length of cable the readings from both ends will be the same and will be the characteristic impedance of that length, the bridge being of such a type that under these circumstances it gives a direct reading of characteristic impedance.

When the cable is not uniform the readings will differ by an amount which is a measure of the sign and magnitude of the non-uniformity, it being assumed that the impedance is approximately a linear function of the length. The mean of the two readings will be approximately the mean characteristic impedance averaged over the length of the cable.

The difference of readings, assuming linear distribution has been found to be substantially constant in phase, i. e. the difference in resistance components of the two readings bears a definite ratio to the difference of reactance components.

Thus if the first reading is $$Z_1 = R_1 - jx_1$$

and the reading from the other end is $$Z_2 = R_2 - jx_2$$

then $R_1 - R_2$ is the resistance difference and $X_1 - X_2$ is the reactance difference and if the frequency is constant and the length of each "coil" is constant then $$\frac{R_1 - R_2}{X_1 - X_2}$$

will be a constant for all cable lengths under test. Thus either $R_1 - R_2$ or $X_1 - X_2$ may be used as a measure of the non-uniformity and it is convenient to use the larger of these two quantities. In fact it is sometimes dangerous to use the smaller of the two readings as this is more likely to be affected in certain cases by departures from linearity rather than by the major linear non-uniformity.

In the type of bridge shown the reading is in terms of resistance shunted by capacity so that it is necessary to convert the readings into the form $R_1 - jx_1$. If the readings of the resistance and condenser are $r_1$ and $c_1$ then $$R_1 = \frac{r_1}{1 + \omega^2 c_1^2 r_1^2}$$

$$X_1 = \frac{\omega c_1 r_1^2}{1 + \omega^2 c_1^2 r_1^2}$$

*Allocation*

A table is then constructed in which against each coil length is given the quantity $$\frac{Z_1 + Z_2}{2}$$

(The modulus is probably sufficient in most cases) and either $R_1 - R_2$ or $X_1 - X_2$ as explained.

The successive lengths which are to be joined together to make up the cable are then chosen from the table so that the values of $$\frac{Z_1 + Z_2}{2}$$

and of the impedance difference, when successively plotted on a graph form a smooth curve or some regular pattern recurring at intervals in the order of a wave length.

The sign of the impedance difference must be taken into account. The sign is of course reversed by reversing the direction in which the length is inserted in the cable. Assuming for the sake of example that the cable comprises three sections $a$, $b$ and $c$ and that the measurements according to the above method showed that their distributed constants were as shown in Fig. 3. It will be seen that the mean impedance of section $b$ is slightly greater than that of section $a$, and that of section $c$ is similarly slightly greater than that of section $b$. If these lengths were connected up exactly in the manner shown in Fig. 3 there would be reflection at frequencies such that the lengths were comparable with a wave length but not at lower frequencies. The best method of connecting the three sections $a$, $b$ and $c$ is as shown in Fig. 4 in which section $a$ has been connected to section $b$ and section $c$ after having been reversed has been connected to section $b$.

Where the sections have distributed constants as represented in Fig. 5, reflection may be prevented by arranging the sections so that a curve substantially as shown in Fig. 6 is obtained. In this case definite irregularities of equal or gradually decreasing or increasing magnitude and of consistent sign occur at regular intervals. A smooth impedance curve is obtained in this way, the case being analogous to that of the pupin loaded cable in which, although loading coils, each causing a very large reflection, are inserted in the cable, provided that the necessary precautions are taken to ensure regularity of loading coil inductance and loading section capacity, the resulting impedance curve is smooth.

In some cases it may be advisable to arrange the shore ends of a cable according to allocation as described above and for the remainder of the cable to assemble the cable lengths in any known manner.

If it is difficult to allocate the lengths owing to some outstanding values of impedance or impedance difference, then lengths may be cut and the halves separately allocated. The bad lengths will perhaps not be the right ones to cut.

If it is necessary to cut or if the lengths of the coils vary, or some other circumstance occurs which makes it necessary to assign a definite meaning to the impedance difference, it is necessary to understand how this difference arises. It is also necessary to know or measure the propagation constant of the cable.

The point at issue now is that it is necessary to know what relation the difference of characteristic impedance between the first foot and the last foot of the cable bears to the observed difference of bridge readings for any given frequency, length of cable and propagation constant.

We have found from practical results that we may assume that the above relation is purely a linear one, i. e. if ZA is the characteristic impedance of the first foot of cable and ZB the characteristic impedance of the last foot and $Z_1$, $Z_2$ $R_1$, $R_2$, $X_1$, $X_2$ are as above then $$Z_A - Z_B = a(R_1 - R_2) = b(X_1 - X_2) = c(Z_1 - Z_2)$$

where $a$, $b$ and $c$ are constants for any given frequency, for any group of "coils" having the same length and propagation constant.

If this is the case the constants may be determined by cutting the coil in half and measuring the mean characteristic impedance of each half of the coil separately, and assuming linearity, the difference of mean characteristic impedance between the two halves is $$\frac{Z_A - Z_B}{2}.$$

Definite values of $Z_1 - Z_2$, $R_1 - R_2$ and $X_1 - X_2$ are obtained and these correspond to a known value of $Z_A - Z_B$.

This experiment must be repeated upon all different lengths involved which means much expensive cutting up of the cable.

As an alternative method the same result may be arrived at on paper by obtaining an expression to relate $Z_A - Z_B$ with $Z_1$ and $Z_2$ for a hypothetical length of cable and this expression may conveniently be obtained by assuming a value of $Z_A - Z_B$ and working back to find a relation thereto of $Z_1$ and $Z_2$.

Let the distribution of constants within the length of cable under test be as represented in Fig. 7. From the method of measurement it will be seen that measured impedance would be the same if the cable length were terminated with an infinite number of similar lengths instead of with the terminating network associated with the bridge. Assume therefore that the cable length is terminated with a series of other cable lengths as shown in dotted lines in Fig. 7.

The impedance at the beginning of the line shown in Fig. 7 may be determined by the following approximate method. First the whole line is assumed to have the datum characteristic impedance. $A_A$ (which is of course $Z_A$) with the exception of one small portion $dx$ which has a characteristic impedance differing from the datum impedance by an amount $dZ$. In other words we can regard this small portion of line as having for example an excessive amount of inductance. The impedance at the point X looking towards the far end of the cable is thus datum impedance plus the reactance due to the excess inductance or $$Z_A + j\omega dL$$

where $Z_A$ is datum impedance and $dL$ is the excess inductance corresponding to $dZ$. By well known formula the reflection coefficient at the point X will be $$\pm \frac{Z_A - (Z_A + j\omega dL)}{(Z_A + j\omega dL) + Z_A}$$

or approximately $$-\frac{j\omega dL}{2Z_A} = -f$$

for current and $$+\frac{j\omega dL}{2Z_A} = f$$

for voltage. Thus there will be a small return of current and voltage to the sending end due to this irregularity. If the sending current and voltage were $I$ and $V = Z_A I$ in the absence of the irregularity, then the irregularity will cause an alteration in both voltage and current so that $I$ becomes $I(1 - f \cdot e^{-2B})$ and $V$ becomes $V(1 + f \cdot e^{-2B})$ where $f$ is the reflection coefficient at point X and B is the propagation constant for the length of circuit up to the point X.

There is thus a modification of impedance given by the formula $$Z = \frac{V(1 + fe^{-2B})}{I(1 - fe^{-2B})} = \frac{Z_A I(1 + fe^{-2B})}{I(1 - fe^{-2B})}$$
$$= Z_A(1 + 2fe^{-2B}) \text{ approximately.}$$

This is the effect of one small element of excess inductance. By summing up the effects of each small element in this way up to infinity the following expression is obtained $$Z_1 = Z_A(1 + 2f_1 e^{-2B_1} + 2f_2 e^{-B_2} \text{ etc.})$$

(The values of $f_1$, $f_2$, $B_1$, $B_2$, etc. are the values of $f$ and B at different points along the cable) so that in this way it is possible to obtain a ratio between $Z_1$, the reading obtained at one end of the cable, and $Z_A$ the characteristic impedance at the first foot in terms of a definite value of $Z_A - Z_B$ (because the value of $dL$ bears a definite and obvious relationship at every point on the circuit to $Z_A - Z_B$).

Similarly since the reflections occurring in the measurement of $Z_2$ are equal and opposite to those considered for $Z_1$.

$$Z_2 = Z_B(1 - 2f_1 e^{-2B_1} - 2f_2 e^{-2B_2} \text{ etc.})$$

so that the relative values of $Z_A$, $Z_B$, $Z_1$ and $Z_2$ are determined, so giving the constants $a$, $b$ and $c$.

From the equations for $Z_1$ and $Z_2$ the value of $Z_A - Z_B$ may be calculated for any particular length. To do this it is necessary to obtain $Z_1$ and $Z_2$ from the bridge as explained. In order to determine the values of $f_1$, $f_2$ in the above formula it is necessary to know the datum inductance. It has been found sufficiently accurate to use in this part of the expression the mean inductance as measured on samples of the cable. Also for ease of calculation of the value of $$f = \frac{j\omega dL}{2Z_A},$$

$Z_A$ may, in this part of the expression, be taken as the mean impedance.

$$\left(\frac{Z_1 + Z_2}{2}\right).$$

Similarly in the value $$f = \frac{j\omega dL}{2Z_B},$$

$Z_B$ may in this part of the expression be taken as $$\frac{Z_1 + Z_2}{2}.$$

$B_1$ and $B_2$ are calculated by known formula from the mean propagation constant.

Having thus obtained the $Z_A - Z_B$ values and knowing the $$\frac{Z_1 + Z_2}{2}$$

values for the different cable lengths the values are arranged in table form and a curve is plotted for each length as in Figs. 3 and 5. (In this case the $Z_A - Z_B$ values determine the slope in place of the $Z_1$ and $Z_2$ values of Figs. 3 and 5.) The lengths are then rearranged so as to form a smooth curve or a regular curve as above explained with reference to Figs. 4 and 6. In the present case the lengths will vary and this is taken into account in the allocation.

More elaborate calculations on similar lines are needed to determine the impedances of quarter lengths instead of half lengths.

What is claimed is:

1. A method of assembling a cable comprising a plurality of manufacturing lengths which comprises determining the distribution of one or more of the cable constants within each of a plurality of said manufacturing lengths, arranging said manufacturing lengths in an order and end-to-end relation such that the variation of cable constants within a manufacturing length when plotted together with the variation of cable constants within other manufacturing lengths follows a regular plan and connecting said lengths together in accordance with said plan.

2. The method of assembling any portion of a cable comprising at least several manufacturing lengths in which the direction of variation of an electric constant within a plurality of said lengths is determined and the lengths are connected together in such a manner that the variation of said constant along the cable results in a regular pattern.

3. A method of assembling any portion of a cable comprising at least several manufacturing lengths in which the variation of an electric constant within each of a plurality of said lengths is determined and the lengths are connected together in a manner such that a curve representing the variation of said characteristic for elemental portions less than a manufacturing length plotted over several manufacturing lengths is smooth.

4. A method in accordance with claim 1, in which the cable constants are measured at a frequency approximating the highest frequency which the cable is expected to transmit.

5. The method of assembling any portion of a cable comprising at least several manufacturing lengths in which the distribution of impedance within a manufacturing length is determined and several manufacturing lengths are connected together in such end-to-end relation that the variation of impedance of the cable results in a more regular pattern than if the lengths were connected without reference to the distribution of impedance within a manufacturing length.

KENNETH ERIC LATIMER.